(12) United States Patent
Jiang et al.

(10) Patent No.: US 11,327,602 B2
(45) Date of Patent: May 10, 2022

(54) TOUCH DRIVING METHOD, TOUCH DISPLAY DEVICE, AND ELECTRONIC DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yichen Jiang, Beijing (CN); Qing Gong, Beijing (CN); Kwang Gyun Jang, Beijing (CN); Hongqiang Luo, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/270,069

(22) PCT Filed: May 15, 2020

(86) PCT No.: PCT/CN2020/090500
§ 371 (c)(1),
(2) Date: Feb. 22, 2021

(87) PCT Pub. No.: WO2021/227003
PCT Pub. Date: Nov. 18, 2021

(65) Prior Publication Data
US 2021/0357096 A1 Nov. 18, 2021

(51) Int. Cl.
*G06F 3/041* (2006.01)
*G09G 3/3266* (2016.01)

(52) U.S. Cl.
CPC ....... *G06F 3/04166* (2019.05); *G09G 3/3266* (2013.01); *G09G 2310/08* (2013.01); *G09G 2354/00* (2013.01)

(58) Field of Classification Search
CPC .. G06F 3/0416; G06F 3/04166; G06F 3/0418; G06F 3/04184; G06F 3/044;
(Continued)

(56) References Cited

U.S. PATENT DOCUMENTS

2014/0160371 A1* 6/2014 Tokita ................... G06F 3/0412
349/12
2014/0292700 A1* 10/2014 Mizuhashi ............ G06F 3/0412
345/173
(Continued)

*Primary Examiner* — Nathan Danielsen
(74) *Attorney, Agent, or Firm* — Chiwin Law LLC

(57) ABSTRACT

A touch driving method for a touch display device, a touch display device, and an electronic device are provided. The touch driving method includes: applying a touch scanning signal, which is periodic, to a touch structure of the touch display device during applying display data to a display structure of the touch display device in a progressively scanning manner. The display structure is stacked with the touch structure, each period of the touch scanning signal includes a signal rising edge and a signal falling edge, and a signal rising edge and a signal falling edge of at least one period of the touch scanning signal are in display scanning periods for scanning display sub-pixels of an identical color in different rows of the display structure.

20 Claims, 5 Drawing Sheets

(58) Field of Classification Search
CPC .... G06F 3/0443; G06F 3/0445; G06F 3/0446; G06F 3/047; G09G 3/3266–3291; G09G 2320/02; G09G 2320/0209–0219; G09G 2320/0233; G09G 2320/0242; G09G 2320/0247; G09G 2320/0257; G09G 2354/00
See application file for complete search history.

(56) References Cited

U.S. PATENT DOCUMENTS

2015/0042616 A1* 2/2015 Takagi ................. G06F 3/0412
                                                       345/174
2018/0004345 A1* 1/2018 Shin ...................... G06F 3/0412

* cited by examiner

Electronic Device 60

Touch Display Device 610

FIG. 7

TOUCH DRIVING METHOD, TOUCH DISPLAY DEVICE, AND ELECTRONIC DEVICE

This application is a U.S. National Phase Entry of International Application No. PCT/CN2020/090500 filed on May 15, 2020, designating the United States of America. The present application claims priority to and the benefit of the above-identified applications and the above-identified applications are incorporated by reference herein in their entirety.

TECHNICAL FIELD

Embodiments of the present disclosure relate to a touch driving method, a touch display device, and an electronic device.

BACKGROUND

With development of display technologies, various types of display devices have been more and more widely used. These display devices can provide users with colorful images and good visual experience. Display devices mainly include liquid crystal display (LCD) devices and organic light-emitting diode (OLED) display devices, and can be applied to various electronic devices with display functions such as a mobile phone, a television, a notebook computer, etc. Based on different needs of users for display devices, display devices can also simultaneously provide multiple functions such as touch control and the like.

SUMMARY

At least one embodiment of the present disclosure provides a touch driving method for a touch display device. The touch display device comprises a display structure and a touch structure stacked with the display structure. The touch driving method comprises: applying a touch scanning signal, that is periodic, to the touch structure during applying display data to the display structure in a progressively scanning manner. Each period of the touch scanning signal comprises a signal rising edge and a signal falling edge, and a signal rising edge and a signal falling edge of at least one period of the touch scanning signal are in display scanning periods for scanning display sub-pixels of an identical color in different rows of the display structure.

For example, in the touch driving method provided by an embodiment of the present disclosure, the display sub-pixels are arranged in a pixel array, and the display sub-pixels of the identical color in different rows are adjacent to each other in a column direction.

For example, in the touch driving method provided by an embodiment of the present disclosure, the display sub-pixels comprise a plurality of first color sub-pixels, a plurality of second color sub-pixels, and a plurality of third color sub-pixels. In two adjacent rows, display sub-pixels in a first row are arranged in a cyclic sequence of one first color sub-pixel, one second color sub-pixel, one third color sub-pixel, and one second color sub-pixel in a row direction. In the two adjacent rows, display sub-pixels in a second row are arranged in a cyclic sequence of one third color sub-pixel, one second color sub-pixel, one first color sub-pixel, and one second color sub-pixel in the row direction.

For example, in the touch driving method provided by an embodiment of the present disclosure, first color sub-pixels and third color sub-pixels in an identical row are scanned in an identical display scanning period, and display scanning periods of the plurality of second color sub-pixels alternate with display scanning periods of the plurality of first color sub-pixels and the plurality of third color sub-pixels.

For example, in the touch driving method provided by an embodiment of the present disclosure, the display sub-pixels are arranged in a pixel array, and the display sub-pixels of the identical color in different rows are adjacent to each other in a row direction and not adjacent to each other in a column direction.

For example, in the touch driving method provided by an embodiment of the present disclosure, the display sub-pixels comprise a plurality of first color sub-pixels, a plurality of second color sub-pixels, and a plurality of third color sub-pixels, and display sub-pixels in each column are arranged in a cyclic sequence of one first color sub-pixel, one second color sub-pixel, and one third color sub-pixel in the column direction.

For example, in the touch driving method provided by an embodiment of the present disclosure, the first color sub-pixels are red sub-pixels, the second color sub-pixels are green sub-pixels, and the third color sub-pixels are blue sub-pixels, or the first color sub-pixels are blue sub-pixels, the second color sub-pixels are green sub-pixels, and the third color sub-pixels are red sub-pixels.

For example, in the touch driving method provided by an embodiment of the present disclosure, in each period of the touch scanning signal, the signal rising edge is prior to the signal falling edge, or in each period of the touch scanning signal, the signal falling edge is prior to the signal rising edge.

For example, in the touch driving method provided by an embodiment of the present disclosure, a frequency of the touch scanning signal is half of a frequency corresponding to a display scanning period of one display sub-pixel.

For example, in the touch driving method provided by an embodiment of the present disclosure, during a display scanning period of each of the display sub-pixels, display data is applied to the each of the display sub-pixels under control of a display scanning signal.

For example, in the touch driving method provided by an embodiment of the present disclosure, the touch structure is configured to switch working states in response to the signal rising edge and the signal falling edge.

For example, in the touch driving method provided by an embodiment of the present disclosure, the signal rising edge is a phase of the touch scanning signal changing from a first level to a second level, the signal falling edge is a phase of the touch scanning signal changing from the second level to the first level, and the second level is higher than the first level.

At least one embodiment of the present disclosure further provides a touch display device. The touch display device comprises a display structure, a touch structure, and a touch controller. The display structure is stacked with the touch structure. The touch controller is configured to apply a touch scanning signal, which is periodic, to the touch structure during applying display data to the display structure in a progressively scanning manner. Each period of the touch scanning signal comprises a signal rising edge and a signal falling edge, and a signal rising edge and a signal falling edge of at least one period of the touch scanning signal are in display scanning periods for scanning display sub-pixels of an identical color in different rows of the display structure.

For example, in the touch display device provided by an embodiment of the present disclosure, the display sub-pixels are arranged in a pixel array, and the display sub-pixels of the identical color in different rows are adjacent to each other in a column direction.

For example, in the touch display device provided by an embodiment of the present disclosure, the display sub-pixels comprise a plurality of first color sub-pixels, a plurality of second color sub-pixels, and a plurality of third color sub-pixels. In two adjacent rows, display sub-pixels in a first row are arranged in a cyclic sequence of one first color sub-pixel, one second color sub-pixel, one third color sub-pixel, and one second color sub-pixel in a row direction. In the two adjacent rows, display sub-pixels in a second row are arranged in a cyclic sequence of one third color sub-pixel, one second color sub-pixel, one first color sub-pixel, and one second color sub-pixel in the row direction.

For example, in the touch display device provided by an embodiment of the present disclosure, the first color sub-pixels are red sub-pixels, the second color sub-pixels are green sub-pixels, and the third color sub-pixels are blue sub-pixels, or the first color sub-pixels are blue sub-pixels, the second color sub-pixels are green sub-pixels, and the third color sub-pixels are red sub-pixels.

For example, the touch display device provided by an embodiment of the present disclosure further comprises a display controller. The display controller is configured to provide a display scanning signal so as to allow the display data to be applied to the display sub-pixels.

For example, in the touch display device provided by an embodiment of the present disclosure, the touch structure comprises a self-capacitive touch structure or a mutual-capacitive touch structure.

For example, in the touch display device provided by an embodiment of the present disclosure, the touch structure and the display structure form an in-cell structure or an on-cell structure.

At least one embodiment of the present disclosure further provides an electronic device, which comprises the touch display device described above.

BRIEF DESCRIPTION OF THE DRAWINGS

In order to clearly illustrate the technical solutions of the embodiments of the present disclosure, the drawings of the embodiments will be briefly described in the following. It is obvious that the described drawings are only related to some embodiments of the present disclosure and thus are not limitative to the present disclosure.

FIG. 7 is a schematic block diagram of an electronic device provided by some embodiments of the present disclosure.

DETAILED DESCRIPTION

Figure 1:
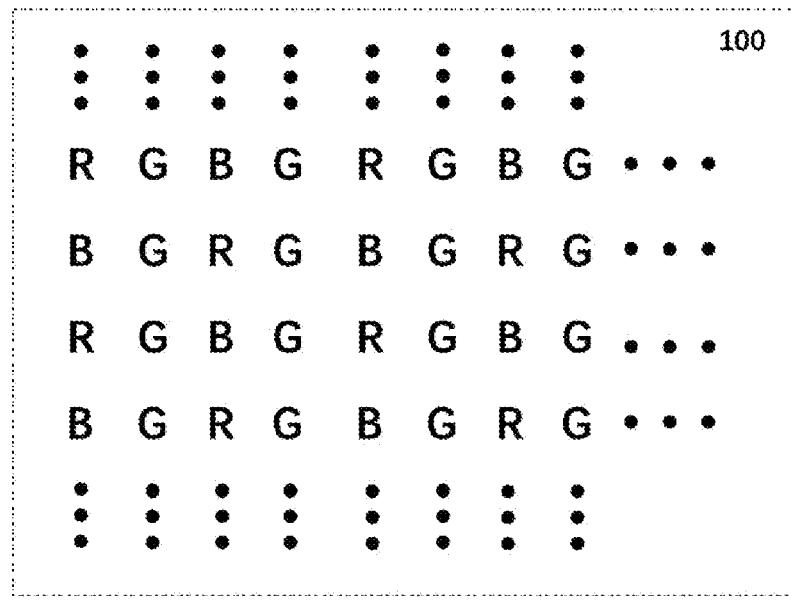
FIG. 1 is a schematic diagram of an arrangement of display sub-pixels of a touch display device provided by some embodiments of the present disclosure.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect," "connected," "coupled," etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In an ordinary display device, a multiplexer (MUX) is usually used to provide data signals to source signal lines (data lines), and each source signal line is connected to sub-pixels of the display device, so as to enable the data signal to be written into the sub-pixel in the scanning period of the sub-pixel of the display device, thereby controlling the light-emitting brightness of each sub-pixel to realize image display. In a display device having both display function and touch function, because the touch layer of the display device is usually close to the display layer, when the display device performs a touch operation, there may be a coupling effect between the touch signal (such as a touch scanning signal or the like) applied to the touch layer and the data signal provided to the sub-pixels of the display layer, which causes the data signal applied to the sub-pixels to fluctuate, so that the data signal is difficult to be accurately written into the sub-pixels. Thus, the image provided by the display device is prone to display abnormalities, for example, bright and dark stripes like water ripples or color-difference stripes may appear in the display image, thereby causing serious adverse influence on the display effect of the image.

At least one embodiment of the present disclosure provides a touch driving method for a touch display device. The touch display device includes a display structure and a touch structure stacked with the display structure. The touch driving method includes: applying a touch scanning signal, which is periodic, to the touch structure during applying display data to the display structure in a progressively scanning manner. Each period of the touch scanning signal includes a signal rising edge and a signal falling edge, and a signal rising edge and a signal falling edge of at least one period of the touch scanning signal are in display scanning periods for scanning display sub-pixels of an identical color in different rows of the display structure.

The touch driving method provided by the embodiments of the present disclosure allows the signal rising edge and the signal falling edge of each period of the touch scanning signal to be in the display scanning periods of display sub-pixels of the identical color, so that the coupling between the display data and the signal rising edge and signal falling edge of the touch scanning signal in the display scanning periods of the display sub-pixels, thereby alleviating or avoiding the adverse influence of the signal rising edge and signal falling edge of the touch scanning signal on the scanning phase of the display sub-pixels, so that display abnormalities in the display image can be avoided, for example, mura phenomenon in the display image can be avoided, and the touch display device can achieve a better image display effect.

Hereinafter, some embodiments of the present disclosure are described in detail with reference to the accompany drawings. It should be noted that the same reference numerals in different drawings are used to refer to the same described elements.

The touch driving method provided by some embodiments of the present disclosure includes the following steps.

Step S10: applying a touch scanning signal, which is periodic, to a touch structure during applying display data to a display structure in a progressively scanning manner. A signal rising edge and a signal falling edge of at least one period of the touch scanning signal are in display scanning periods for scanning display sub-pixels of an identical color in different rows of the display structure.

For example, the touch driving method provided by the embodiments of the present disclosure may be used for a touch display device including a display structure and a touch structure stacked with the display structure. Each period of the touch scanning signal includes a signal rising edge and a signal falling edge, and the signal rising edge and the signal falling edge of at least one period of the touch scanning signal are in the display scanning periods for scanning display sub-pixels of the identical color in different rows of the display structure. For example, the signal rising edge and the signal falling edge of each period of the touch scanning signal are in the display scanning periods for scanning display sub-pixels of the identical color in different rows of the display structure. Thus, the touch driving method provided by the embodiments of the present disclosure can alleviate the coupling effect of the signal rising edge and the signal falling edge of the touch scanning signal applied to the touch structure on the display data (such as the aforementioned data signal) applied to the display sub-pixels during the display scanning periods of the display sub-pixels, thereby alleviating the adverse influence of the signal rising edge and signal falling edge of the touch scanning signal on the scanning phase of the display sub-pixels, and further avoiding display abnormalities in the display image, for example, avoiding mura phenomenon in the display image, so that the image display quality of the touch display device can be improved, and a better image display effect can be provided.

For example, in some embodiments of the present disclosure, the display sub-pixels are arranged in a pixel array, and the display sub-pixels of the identical color in different rows are adjacent to each other in a column direction. For example, display sub-pixels of the same color in different rows are located in adjacent rows.

Hereinafter, the touch driving method provided by the embodiments of the present disclosure is described in detail by taking the arrangement of display sub-pixels illustrated in FIG. 1 as an example.

FIG. 1 is a schematic diagram of an arrangement of display sub-pixels of a touch display device provided by some embodiments of the present disclosure. For example, the touch display device provided with the arrangement of display sub-pixels illustrated in FIG. 1 can be driven by the touch driving method provided by the embodiments of the present disclosure.

For example, as illustrated in FIG. 1, the display sub-pixels are arranged in a pixel array 100. The display sub-pixels include a plurality of first color sub-pixels R, a plurality of second color sub-pixels G, and a plurality of third color sub-pixels B. In two adjacent rows, display sub-pixels in the first row are arranged in a cyclic sequence of one first color sub-pixel R, one second color sub-pixel G, one third color sub-pixel B, and one second color sub-pixel G in a row direction, and display sub-pixels in the second row are arranged in a cyclic sequence of one third color sub-pixel G, one second color sub-pixel B, one first color sub-pixel R, and one second color sub-pixel G in the row direction. For example, the pixel array 100 is the widely used pentile pixel arrangement.

It should be noted that, in the description of the present disclosure, the display sub-pixels located in the same row refer to the display sub-pixels including corresponding pixel circuits substantially along the same extending line in the row direction, and the display sub-pixels located in different rows refer to the display sub-pixels including corresponding pixel circuits located along two different extending lines in the row direction. The display sub-pixels located in the same column refer to the display sub-pixels including corresponding pixel circuits substantially along the same extending line in the column direction, and the display sub-pixels located in different columns refer to the display sub-pixels including corresponding pixel circuits located along two different extending lines in the column direction. The extending line may be a straight line or a curve, which is not limited in the embodiments of the present disclosure. That is, in the description of the present disclosure, "in the identical row" means that the pixel circuits of the display sub-pixels are located in the identical row, and "in the identical column" means that the pixel circuits of the display sub-pixels are located in the identical column, rather than referring to limitation of location of the entire area of the display sub-pixel or the pixel opening area of the display sub-pixel.

For example, in the case illustrated in FIG. 1, the first color sub-pixel R, the second color sub-pixel G, and the third color sub-pixel B are located in the same row, which means that the pixel circuit of the first color sub-pixel R, the pixel circuit of the second color sub-pixel G, and the pixel circuit of the third color sub-pixel B are located in the same row, that is, the pixel circuit of the first color sub-pixel R, the pixel circuit of the second color sub-pixel G, and the pixel circuit of the third color sub-pixel B are located along the same extending line in the row direction.

It should be noted that, for clarity and conciseness, FIG. 1 does not specifically illustrate the relative positions of the display sub-pixels in the actual arrangement. For example, FIG. 1 does not illustrate the relative positions of the pixel opening areas of the display sub-pixels in the actual arrangement. For example, because the pixel opening area of each display sub-pixel may have a different shape from each other, the center of the pixel opening area of each display sub-pixel may not be located along the same horizontal line in the row direction or along the same vertical line in the column direction in the actual arrangement of the display sub-pixels. For example, the center of the pixel opening area of each first color sub-pixel R and the center of the pixel opening area of each third color sub-pixel B may be located along the same first horizontal line extending in the row direction, the center of the pixel opening area of each second color sub-pixel G is located along the same second horizontal line extending in the row direction, and the first horizontal line and the second horizontal line have a small spacing in the column direction, thereby facilitating the arrangement of the display sub-pixels in the row direction. The actual specific structure, arrangement position, or the like of the pixel opening area of the display sub-pixel can be referred to conventional designs in the art, and the embodiments of the present disclosure are not limited in this aspect.

Figure 2A:
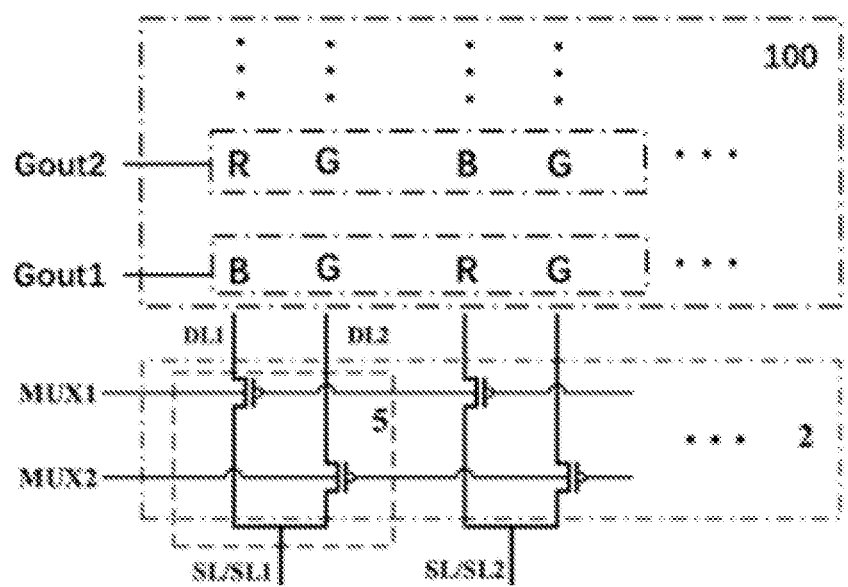
FIG. 2A is a schematic diagram of a signal applying circuit of a touch display device provided by some embodiments of the present disclosure.
Figure 3A:
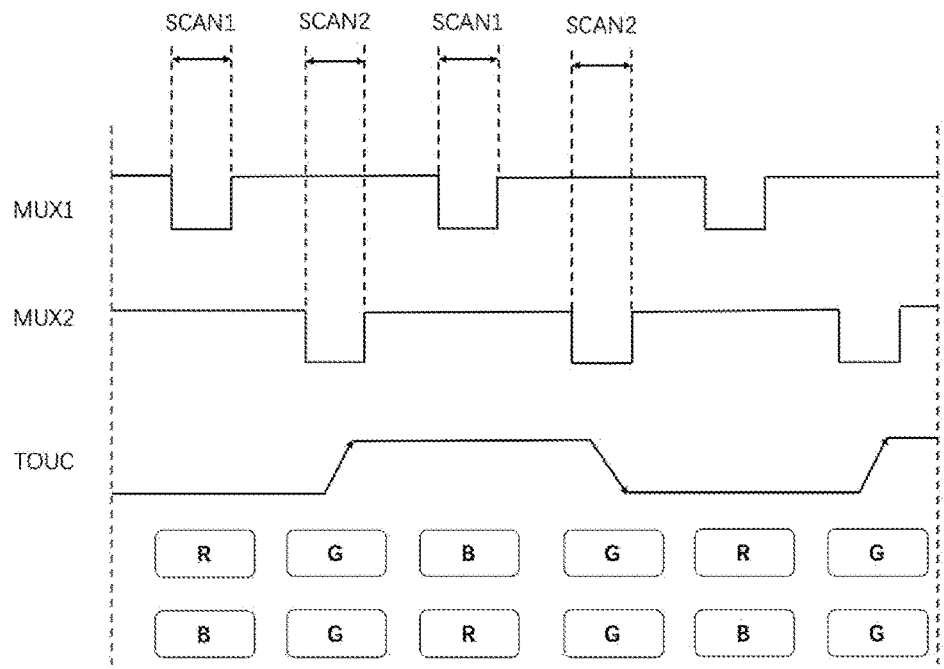
FIG. 3A is a signal timing diagram of a touch display device provided by some embodiments of the present disclosure.

FIG. 2A is a schematic diagram of a signal applying circuit of a touch display device provided by some embodiments of the present disclosure, and FIG. 3A is a signal timing diagram of a touch display device provided by some embodiments of the present disclosure.

For example, with reference to FIG. 1, FIG. 2A, and FIG. 3A, the first color sub-pixel R and the third color sub-pixel B located in the same row are scanned in the same display scanning period (for example, the first display scanning period SCAN1), and the display scanning period (for example, the second display scanning period SCAN2) of the second color sub-pixel G alternates with the display scanning period of the first color sub-pixel R and the third color sub-pixel B. In the first display scanning period SCAN1, the display data CTDR corresponding to the first color sub-pixel R and the display data CTDB corresponding to the third color sub-pixel B are written into the first color sub-pixel R and the third color sub-pixel B, respectively. In the second display scanning period SCAN2, the display data CTDG corresponding to the second color sub-pixel G is written into the second color sub-pixel G.

For example, as illustrated in FIG. 2A, the signal applying circuit of the touch display device may include a branch circuit 2, and for example, the branch circuit 2 is a multiplexer (MUX) circuit. The branch circuit 2 includes a plurality of branch sub-circuits 5, and each branch sub-circuit 5 is connected to two data lines DL1 and DL2, so as to provide corresponding display data CTDR, CTDB or CTDG for display sub-pixels in two adjacent columns in the pixel array 100. The data lines DL1 and DL2 are combined into one source signal line SL (for example, the source signal lines SL1 and SL2) through the branch circuit 2, thereby achieving the purpose of reducing the number of wires.

For example, in the case where the first display scanning signal MUX1 (that is, the first branch control signal) is at an active level (that is, during the first display scanning period SCAN1), the display data CTDR and display data CTDB are provided to the first color sub-pixel R and the third color sub-pixel B, respectively. In the case where the second display scanning signal MUX2 (that is, the second branch control signal) is at an active level (that is, during the second display scanning period SCAN2), the display data CTDG is provided to the second color sub-pixel G. Here, in order to simplify the description, only two gate scanning signals Gout1 and Gout2 are illustrated, but it should be understood that the number of gate scanning signals is not limited to this.

Figure 2B:
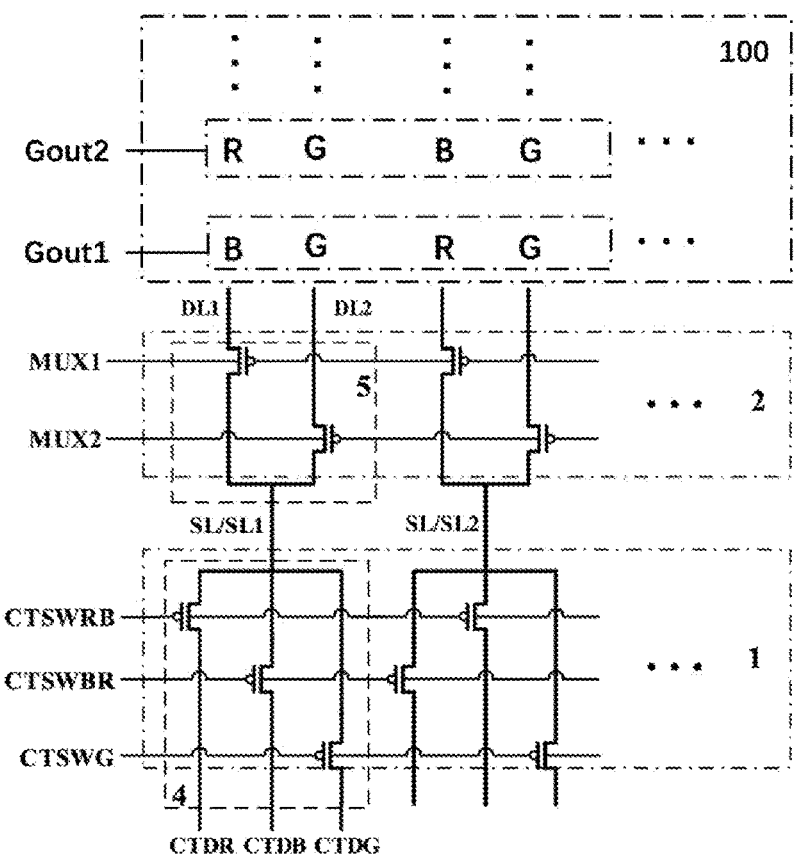
FIG. 2B is a schematic diagram of a specific example of a signal applying circuit of a touch display device provided by some embodiments of the present disclosure.

For example, FIG. 2B is a schematic diagram of a specific example of a signal applying circuit of a touch display device provided by some embodiments of the present disclosure. For example, FIG. 2B provides a specific example of the signal applying circuit of the touch display device illustrated in FIG. 2A. It should be noted that except for an input circuit 1, other structures of the signal applying circuit of the touch display device illustrated in FIG. 2B are basically the same as or similar to those of the signal applying circuit of the touch display device illustrated in FIG. 2A, and details are not described herein.

For example, as illustrated in FIG. 2B, the signal applying circuit of the touch display device further includes an input circuit 1. For example, the input circuit 1 is a cell test (CT) circuit. The input circuit 1 includes a plurality of input sub-circuits 4, and the plurality of input sub-circuits 4 are connected with the plurality of branch sub-circuits 5 of the branch circuit 2 in one-to-one correspondence.

During the display data writing process, each input sub-circuit 4 receives the display data CTDR, CTDB and CTDG, and the display data CTDR, CTDB, and CTDG may be written into the corresponding display sub-pixels in the display scanning period of the corresponding display sub-pixels, respectively, under control of the first display scanning signal MUX1, the second display scanning signal MUX2, the control signals CTSWRB, CTSWBR, and CTSWG, and the gate scanning signals Gout1 and Gout2, so as to achieve independent control of each display sub-pixel to implement image display.

For example, the row scanning array (such as a GOA circuit, not illustrated in the figure) is provided with a pair of clock signals and a trigger signal, so as to generate gate scanning signals Gout1 and Gout2 which allow the display sub-pixels arranged in the array to be progressively turned on. For example, taking the gate scanning signal Gout1 as an example, when the gate scanning signal Gout1 is at an active level, the corresponding display sub-pixels in the first row of the pixel array 100 are in the scanning phase. At this time, the gate electrode of the driving transistor of each display sub-pixel in the first row may be written into the display data provided by the corresponding data line DL1 or DL2, and the voltage level of the display data determines the light-emitting brightness of the corresponding display sub-pixel. After all the gate scanning signals corresponding to the pixel array 100 are turned on once in turn, the gate scanning signal Gout1 is turned on again to refresh the voltage of the gate electrode of the driving transistor of each display sub-pixel in the first row, and the process cycles, so as to display the image.

The specific control method of the signal applying circuit through each of the above-mentioned signals may be with reference to the conventional designs, and details are not described herein.

For example, in the case where the touch display device is a liquid crystal touch display device, each display sub-pixel includes, for example, a pixel electrode and a storage capacitor, display data (such as CTDR, CTDB, and CTDG) may be written into the pixel electrode during the display scanning period, and the storage capacitor stores the display data and maintains the potential of the pixel electrode at a potential corresponding to the display data, thereby allowing liquid crystal molecules to deflect, so that the display sub-pixel emits light according to the required gray scale. For example, in the case where the touch display device is an OLED touch display device, each display sub-pixel includes, for example, a pixel circuit and an OLED light-emitting element. The pixel circuit is, for example, a common 2T1C (that is, 2 transistors and 1 storage capacitor) circuit or a circuit with compensation function, display data may be written into the pixel circuit and stored in the pixel circuit during the display scanning period, and the OLED light-emitting element is driven by the pixel circuit to emit light according to the required gray scale. For example, the display scanning period is the effective period of the first display scanning signal MUX1 and the second display scanning signal MUX2. Detailed description of the writing process of the display data may be with reference to the conventional designs, and details are not described herein.

For example, as illustrated in FIG. 3A, the signal rising edge and signal falling edge of each period of the touch scanning signal TOUC are both located in the display scanning periods for scanning the second color sub-pixels G, for example, in the second display scanning periods SCAN2. Therefore, the signal rising edge and signal falling edge of the touch scanning signal TOUC may only slightly affect the light-emitting brightness of the second color sub-pixel G in the second display scanning periods SCAN2, for example, the light-emitting brightness of the second color sub-pixel G may be slightly darker or brighter, and because the frequency of the display scanning period of the display sub-pixel is very high, the bright and dark effects of the second color sub-pixel G with a single color may cancel each other out, thereby eliminating the mura phenomenon. The signal rising edge and signal falling edge of the touch scanning signal TOUC may not cause the coupling effect on the display data applied to the first color sub-pixel R and the third color sub-pixel B during the first display scanning period SCAN1 of the first color sub-pixel R and the third color sub-pixel B, so as to avoid the adverse effect of the signal rising edge and the signal falling edge of the touch scanning signal TOUC on the display data during the scanning phase of the first color sub-pixel R and the third color sub-pixel B. By the above method, display abnormalities in the display image provided by the touch display device can be avoided, for example, mura phenomenon in the display image due to the influence of the display data applied to sub-pixels of a plurality of colors can be avoided, and the touch display device can provide a better image display effect.

For example, in the first display scanning period SCAN1 of the first color sub-pixel R and the third color sub-pixel B, the display data corresponding to the first color sub-pixel R and the third color sub-pixel B may be respectively applied to the first color sub-pixel R and the third color sub-pixel B under control of the first display scanning signal MUX1, so as to control the light-emitting brightness of the first color sub-pixel R and the third color sub-pixel B. In the second display scanning period SCAN2 of the second color sub-pixel G, the display data corresponding to the second color sub-pixel G is applied to the second color sub-pixel G under control of the second display scanning signal MUX2, thereby controlling the light-emitting brightness of the second color sub-pixel G.

It should be noted that in the embodiments illustrated in FIG. 2A (or FIG. 2B) and FIG. 3A, the display data CTDR and CTDB are applied to the first color sub-pixel R and the third color sub-pixel B under control of the low level of the first display scanning signal MUX1, and the display data CTDG is applied to the second color sub-pixel G under control of the low level of the second display scanning signal MUX2. While in some other embodiments of the present disclosure, the display data CTDR and CTDB may also be configured to be applied to the first color sub-pixel R and the third color sub-pixel B under control of the high level of the first display scanning signal MUX1, and the display data CTDG may also be configured to be applied to the second color sub-pixel G under control of the high level of the second display scanning signal MUX2. The embodiments of the present disclosure are not limited in this aspect.

For example, in the first display scanning period SCAN1 of the first color sub-pixel R and the third color sub-pixel B, the gate scanning signal (for example, the gate scanning signal Gout1 corresponding to the display sub-pixels in the first row of the pixel array 100) corresponding to the display sub-pixel row where the first color sub-pixel R and the third color sub-pixel B are located is simultaneously applied to the first color sub-pixel R and the third color sub-pixel B, so that the first color sub-pixel R and the third color sub-pixel B are scanned, so as to allow the display data CTDR and CTDB to be written into the corresponding sub-pixels. In the second display scanning period SCAN2 of the second color sub-pixel G, the gate scanning signal corresponding to the display sub-pixel row where the second color sub-pixel G is located is applied to the second color sub-pixel G, so that the second color sub-pixel G is scanned, so as to allow the display data CTDG to be written into the second color sub-pixel G.

For example, the pixel array 100 may sequentially apply the corresponding gate scanning signal to each row of display sub-pixels in order to implement the progressive scanning of the display sub-pixels in the pixel array 100. Alternatively, the pixel array 100 may also use the sequence of applying gate scanning signals in an interlacing manner to implement the scanning of the display sub-pixels in the pixel array 100, for example, the display sub-pixels of the odd rows or even rows in the pixel array 100 are progressively scanned, and the embodiments of the present disclosure are not limited in this aspect.

For example, the gate scanning signal may be provided by at least one gate driving circuit in the touch display device, so as to implement the progressive scanning of the display sub-pixels in the pixel array 100. For example, the gate driving circuit may be provided in a usual form of a plurality of cascaded shift register units, so as to output a set of shift signals as the gate scanning signals. For example, the gate driving circuit can be provided on the array substrate of the touch display device to form an array substrate gate-driver-on-array (GOA) circuit, or can also be provided outside the array substrate, for example, the gate driving circuit may be electrically connected to the scanning lines on the array substrate such as through a flexible circuit board or the like, so that the display sub-pixels in the pixel array 100 can be progressively scanned. For example, in the case where the gate driving circuit is used to drive the pixel array 100, the gate driving circuit may be arranged on one side of the touch display device. Certainly, the gate driving circuits may also be provided on both sides of the touch display device so as to realize bilateral driving. For example, one gate driving circuit may be provided on one side of the touch display device to realize scanning of display sub-pixels of odd rows, and another gate driving circuit may be provided on the other side of the touch display device so as to realize scanning of display sub-pixels of even rows.

For example, in the embodiments of the present disclosure, the first color sub-pixel R may be a red sub-pixel, the second color sub-pixel G may be a green sub-pixel, and the third color sub-pixel B may be a blue sub-pixel. In some other embodiments of the present disclosure, the first color sub-pixel may be a blue sub-pixel, the second color sub-pixel may be a green sub-pixel, and the third color sub-pixel may be a red sub-pixel. Alternatively, the first color sub-pixel may be a blue sub-pixel, the second color sub-pixel may be a red sub-pixel, and the third color sub-pixel may be a green sub-pixel. The embodiments of the present disclosure do not limit the specific colors of light of the first color sub-pixel, the second color sub-pixel, and the third color sub-pixel, as long as the colors of light of the first color sub-pixel, the second color sub-pixel, and the third color sub-pixel are different from each other.

For example, in some other embodiments of the present disclosure, the first color sub-pixel, the second color sub-pixel, and the third color sub-pixel may also be display sub-pixels of other different colors. Alternatively, the display sub-pixels may also include a fourth color sub-pixel, and the color of light of the fourth color sub-pixel is different from the colors of light of the first color sub-pixel, the second color sub-pixel, and the third color sub-pixel. For example, the fourth color sub-pixel may be scanned in the same display scanning period (for example, the first display scanning period SCAN1) as the first color sub-pixel and the third color sub-pixel, or the display scanning period of the fourth color sub-pixel may be different from the display scanning period of the first color sub-pixel and the third color sub-pixel and also be different from the display scanning period of the second color sub-pixel, which is not limited in the embodiments of the present disclosure.

For example, as illustrated in FIG. 3A, the frequency of the touch scanning signal TOUC is ½ of the frequency corresponding to the display scanning period of one display sub-pixel, that is, the frequency of the touch scanning signal TOUC is ½ of the frequency corresponding to the first display scanning period SCAN1 of the first color sub-pixel R and the third color sub-pixel B, or ½ of the frequency corresponding to the second display scanning period SCAN2 of the second color sub-pixel G.

It should be noted that the embodiments of the present disclosure do not limit the relationship between the frequency of the touch scanning signal and the frequency corresponding to the display scanning period of the display sub-pixel. For example, in some other embodiments of the present disclosure, the frequency of the touch scanning signal may also be ¼, ⅙, or other suitable values of the frequency corresponding to the display scanning period of one display sub-pixel.

For example, as illustrated in FIG. 3A, the signal rising edge of the touch scanning signal TOUC is a phase in which the potential of the touch scanning signal TOUC changes from a first level to a second level, and the signal falling edge of the touch scanning signal TOUC is a phase in which the potential of the touch scanning signal TOUC changes from the second level to the first level. The second level is higher than the first level. For example, the first level may be a low level or a ground level, and the second level may be a high level.

Figure 3B:
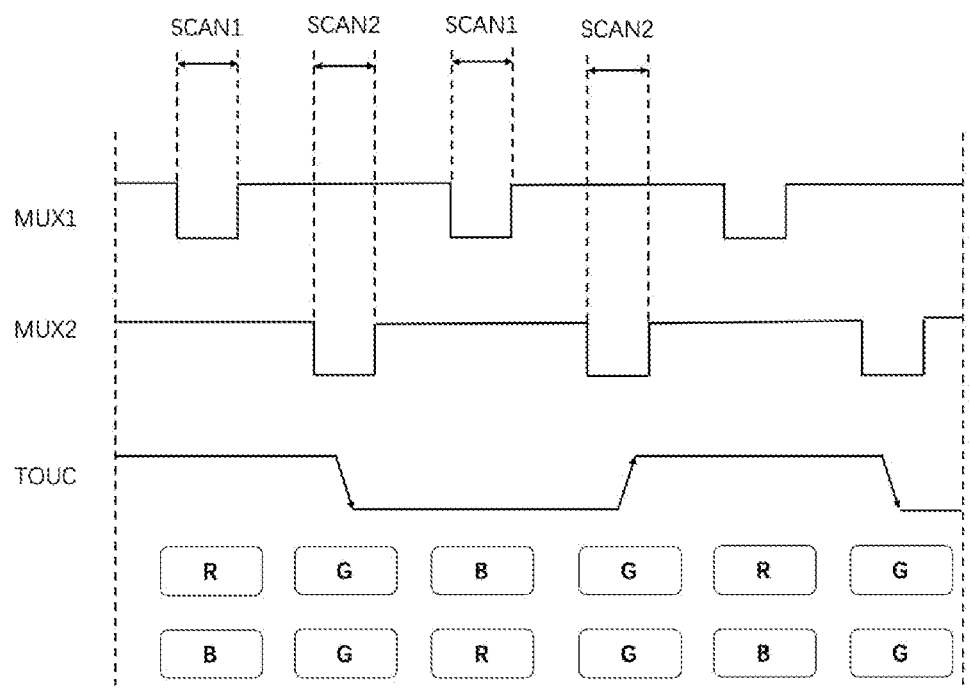
FIG. 3B is a signal timing diagram of another touch display device provided by some embodiments of the present disclosure.

For example, as illustrated in FIG. 3A, in each period of the touch scanning signal TOUC, the signal rising edge is prior to the signal falling edge. In this case, the high level of the touch scanning signal TOUC is the effective working level, that is, when the touch scanning signal TOUC is at a high level, the touch display device performs the corresponding touch operation. Alternatively, in some other embodiments of the present disclosure, as illustrated in FIG. 3B, in each period of the touch scanning signal TOUC, the signal falling edge is prior to the signal rising edge. In this case, the low level of the touch scanning signal TOUC is the effective working level. The embodiments of the present disclosure are not limited in this aspect.

For example, in some embodiments of the present disclosure, the touch structure can switch the working state in response to the signal rising edge and the signal falling edge of the touch scanning signal TOUC, thereby performing the periodic touch scanning operation. For example, the touch scanning signal TOUC may be any signal in the touch detection process of the touch structure. The touch scanning signal TOUC may be a touch scanning signal applied to the touch electrode of the touch structure, or may be a touch sensing signal from the touch electrode of the touch structure, or further may be an enable signal for controlling the working state of the touch structure, and the embodiments of the present disclosure are not limited in this aspect.

For example, in some embodiments of the present disclosure, the touch structure may include a self-capacitive touch structure or a mutual-capacitive touch structure. For example, in the case where the touch structure adopts the self-capacitive touch structure, the touch structure may respond to the signal rising edge and the signal falling edge of the touch scanning signal TOUC so as to detect the capacitance change at the touch position. For example, in the case where the touch structure adopts the mutual-capacitive touch structure, the touch structure may respond to the signal rising edge and the signal falling edge of the touch scanning signal TOUC so as to perform scanning and sensing operations.

For example, in some embodiments of the present disclosure, the touch structure and the display structure may form an in-cell structure or an on-cell structure.

For example, in the case where the touch structure and the display structure form the on-cell structure, the display structure can be a normal display panel, such as a liquid crystal display panel, an OLED display panel, a QLED display panel, or the like, and the touch structure can be a touch layer or a touch panel. In this way, the display structure may include, for example, an array substrate and an opposite substrate disposed opposite to the array substrate, and the array substrate and the opposite substrate are combined with each other to form a space for accommodating liquid crystal materials or OLED elements. The touch structure is, for example, directly formed on the opposite substrate or attached to the opposite substrate.

For another example, in the case where the touch structure and the display structure form the in-cell structure, the display structure may be an array substrate, an electroluminescent material or a liquid crystal layer is provided on the array substrate, and the touch structure may be a touch layer. In this way, the touch structure is provided on the array substrate, and the array substrate may further include a plurality of functional film layers, which may be determined according to actual requirements. The structural form of the touch structure and the display structure is not limited in the embodiments of the present disclosure.

It should be noted that the touch driving method provided by some embodiments of the present disclosure can be applied to an OLED display device, a QLED display device, or a liquid crystal display device with a touch function, or can also be applied to any other types of display devices with a touch function, and the embodiments of the present disclosure are not limited in this aspect.

For example, the touch driving method provided by the embodiments of the present disclosure can be applied to touch display devices with a small thickness and a narrow frame, such as flexible multi-layer on-cell (FMLOC) display devices with touch functions, so that the optical display effect of this type of touch display device can be further improved, thereby providing a better display image.

For example, in some embodiments of the present disclosure, the display sub-pixels are arranged in a pixel array, and the display sub-pixels of the identical color in different rows are adjacent to each other in the row direction and not adjacent to each other in the column direction. For example, the display sub-pixels of the identical color in different rows are located in adjacent columns and are not located in adjacent rows.

Figure 4:
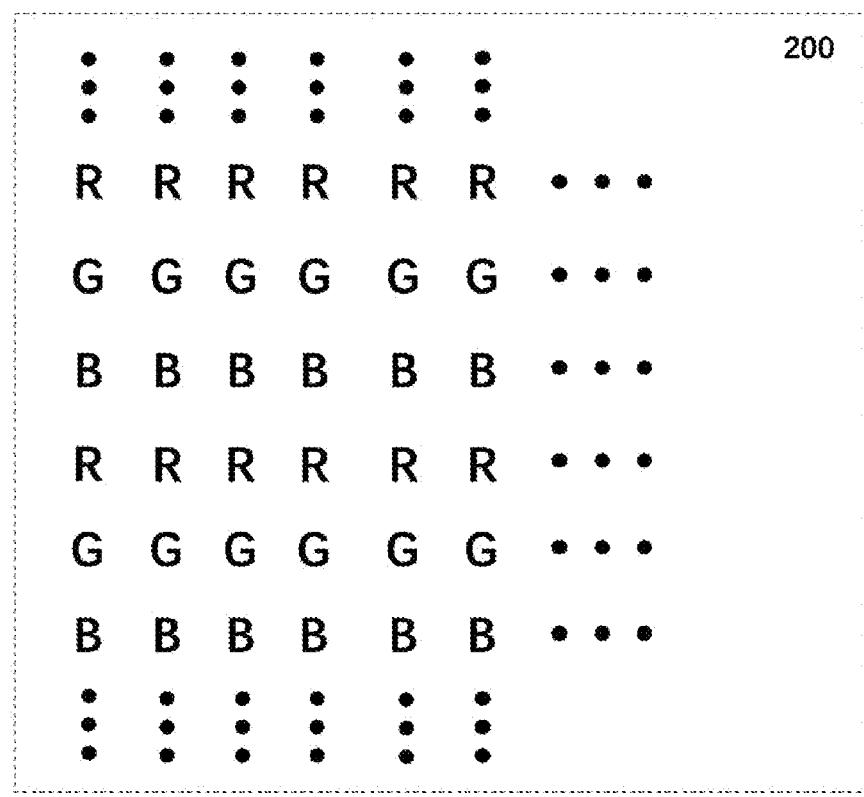
FIG. 4 is a schematic diagram of an arrangement of display sub-pixels of another touch display device provided by some embodiments of the present disclosure.

FIG. 4 is a schematic diagram of an arrangement of display sub-pixels of another touch display device provided by some embodiments of the present disclosure. For example, the touch display device adopting the arrangement of display sub-pixels illustrated in FIG. 4 can be driven by the touch driving method provided by the embodiments of the present disclosure. The touch driving method for the touch display device is basically the same as or similar to the touch driving method for the touch display device including the pixel array 100 illustrated in FIG. 1, and can be with reference to the description of the touch driving method for the touch display device including the pixel array 100 in the above embodiments, and details are not described herein.

For example, as illustrated in FIG. 4, the display sub-pixels are arranged in a pixel array 200. The display sub-pixels include a plurality of first color sub-pixels R, a plurality of second color sub-pixels G, and a plurality of third color sub-pixels B. Display sub-pixels in each column are arranged in a cyclic sequence of one first color sub-pixel R, one second color sub-pixel G, and one third color sub-pixel B in the column direction.

For example, the first color sub-pixel R may be a red sub-pixel, the second color sub-pixel G may be a green sub-pixel, and the third color sub-pixel B may be a blue sub-pixel. Alternatively, the first color sub-pixel may be a blue sub-pixel, the second color sub-pixel may be a green sub-pixel, and the third color sub-pixel may be a red sub-pixel. Alternatively, the first color sub-pixel, the second color sub-pixel, and the third color sub-pixel may also be sub-pixels of other different colors. The embodiments of the present disclosure do not limit the specific colors of light of the first color sub-pixel, the second color sub-pixel, and the third color sub-pixel, as long as the colors of light of the first color sub-pixel, the second color sub-pixel, and the third color sub-pixel are different from each other.

It should be noted that in the description of the present disclosure, the display sub-pixels located in the same row refer to the display sub-pixels including corresponding pixel circuits substantially along the same extending line in the row direction, and the display sub-pixels located in different rows refer to the display sub-pixels including corresponding pixel circuits located along two different extending lines in the row direction. The display sub-pixels located in the same column refer to the display sub-pixels including corresponding pixel circuits substantially along the same extending line in the column direction, and the display sub-pixels located in different columns refer to the display sub-pixels including corresponding pixel circuits located along two different extending lines in the column direction. The extending line may be a straight line or a curve, which is not limited in the embodiments of the present disclosure. That is, in the description of the present disclosure, "in the identical row" means that the pixel circuits of the display sub-pixels are located in the identical row, and "in the identical column" means that the pixel circuits of the display sub-pixels are located in the identical column, rather than referring to limitation of location of the entire area of the display sub-pixel or the pixel opening area of the display sub-pixel.

For example, in the case illustrated in FIG. 4, the first color sub-pixel R, the second color sub-pixel G, and the third color sub-pixel B are located in the same column, which means that the pixel circuit of the first color sub-pixel R, the pixel circuit of the second color sub-pixel G, and the pixel circuit of the third color sub-pixel B are located in the same column, that is, the pixel circuit of the first color sub-pixel R, the pixel circuit of the second color sub-pixel G, and the pixel circuit of the third color sub-pixel B are located along the same extending line in the column direction.

It should be noted that, for clarity and conciseness, FIG. 4 does not specifically illustrate the relative positions of the display sub-pixels in the actual arrangement. For example, FIG. 4 does not illustrate the relative positions of pixel opening areas of the display sub-pixels in the actual arrangement. For example, because the pixel opening area of each display sub-pixel may have a different shape from each other, the center of the pixel opening area of each display sub-pixel may not be located along the same horizontal line in the row direction or along the same vertical line in the column direction in the actual arrangement of the display sub-pixels. For example, the center of the pixel opening area of each first color sub-pixel R and the center of the pixel opening area of each third color sub-pixel B may be located along the same first vertical line extending in the column direction, the center of the pixel opening area of each second color sub-pixel G is located along the same second vertical line extending in the column direction, and the first vertical line and the second vertical line have a small spacing in the row direction, thereby facilitating the arrangement of the display sub-pixels in the column direction. The actual specific structure, arrangement position, or the like of the pixel opening area of the display sub-pixel can be referred to conventional designs in the art, and the embodiments of the present disclosure are not limited in this aspect.

For example, in some other embodiments of the present disclosure, the display sub-pixels may further include a fourth color sub-pixel, and the color of light of the fourth color sub-pixel is different from the color of light of the first color sub-pixel, the color of light of the second color sub-pixel, and the color of light of the third color sub-pixel. The embodiments of the present disclosure are not limited in this aspect.

It should be noted that the touch driving method provided by the embodiments of the present disclosure can also be applied to touch display devices adopting other display sub-pixel arrangements, and the embodiments of the present disclosure are not limited in this aspect.

At least one embodiment of the present disclosure further provides a touch display device. The touch display device includes a display structure, a touch structure, and a touch controller. The display structure is stacked with the touch structure, the touch controller is configured to apply a periodic touch scanning signal to the touch structure during applying display data to the display structure in a progressively scanning manner, each period of the touch scanning signal includes a signal rising edge and a signal falling edge, and a signal rising edge and a signal falling edge of at least one period of the touch scanning signal are in display scanning periods for scanning display sub-pixels of an identical color in different rows of the display structure.

The touch display device provided by the embodiments of the present disclosure allows the signal rising edge and the signal falling edge of at least one period, such as each period, of the touch scanning signal to be in the display scanning periods of display sub-pixels of the identical color, so that the coupling between the display data applied to the display structure and the signal rising edge and signal falling edge of the touch scanning signal in the display scanning period of the display sub-pixel, thereby alleviating or avoiding the adverse influence of the signal rising edge and signal falling edge of the touch scanning signal on the scanning phase of the display sub-pixel, so that display abnormalities in the display image can be avoided, for example, mura phenomenon in the display image can be avoided, and the touch display device can achieve a better image display effect.

Figure 5:
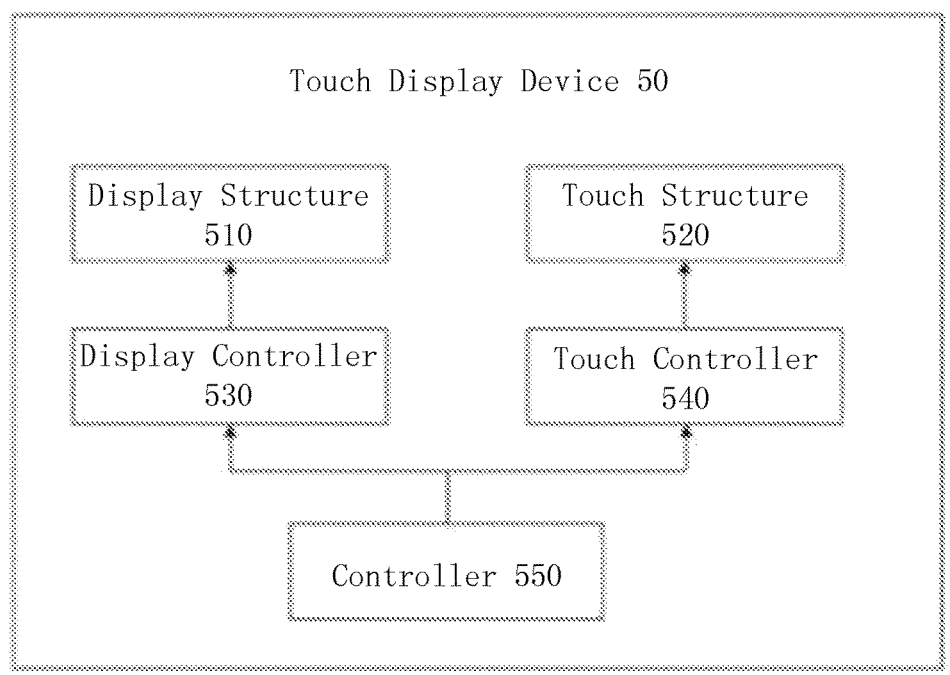
FIG. 5 is a schematic block diagram of a touch display device provided by some embodiments of the present disclosure.

FIG. 5 is a schematic block diagram of a touch display device provided by some embodiments of the present disclosure. For example, as illustrated in FIG. 5, a touch display device 50 includes a display structure 510, a touch structure 520, and a touch controller 540. The display structure 510 is stacked with the touch structure 520. The touch controller 540 is configured to apply a periodic touch scanning signal to the touch structure 520 during applying display data to the display structure 510 in a progressively scanning manner. Each period of the touch scanning signal includes a signal rising edge and a signal falling edge, and a signal rising edge and a signal falling edge of at least one period, such as each period, of the touch scanning signal are in display scanning periods for scanning display sub-pixels of an identical color in different rows of the display structure 510.

For example, in the touch display device 50 illustrated in FIG. 5, the display sub-pixels are arranged in a pixel array, and the display sub-pixels of the identical color in different rows are adjacent to each other in the column direction, for example, located in adjacent rows. For example, the pixel array may be the pixel array 100 illustrated in FIG. 1.

For example, in the touch display device 50 illustrated in FIG. 5, the display sub-pixels of the display structure 510 include a plurality of first color sub-pixels, a plurality of second color sub-pixels, and a plurality of third color sub-pixels. In two adjacent rows, display sub-pixels in the first row are arranged in a cyclic sequence of one first color sub-pixel, one second color sub-pixel, one third color sub-pixel, and one second color sub-pixel in a row direction, and display sub-pixels in the second row are arranged in a cyclic sequence of one third color sub-pixel, one second color sub-pixel, one first color sub-pixel, and one second color sub-pixel in the row direction. For example, reference may be made to the arrangement of display sub-pixels in the pixel array 100 illustrated in FIG. 1.

For example, in the touch display device 50 illustrated in FIG. 5, the first color sub-pixel is a red sub-pixel, the second color sub-pixel is a green sub-pixel, and the third color sub-pixel is a blue sub-pixel. Alternatively, the first color sub-pixel is a blue sub-pixel, the second color sub-pixel is a green sub-pixel, and the third color sub-pixel is a red sub-pixel.

For example, in the touch display device 50 illustrated in FIG. 5, the touch display device 50 further includes a display controller 530, and the display controller 530 is configured to provide a display scanning signal, so as to allow the display data to be applied to the display sub-pixels. For example, the display controller 530 may provide the aforementioned first display scanning signal MUX1 and second display scanning signal MUX2.

For example, in the touch display device 50 illustrated in FIG. 5, the touch structure 520 includes a self-capacitive touch structure or a mutual-capacitive touch structure.

For example, in the touch display device 50 illustrated in FIG. 5, the touch structure 520 and the display structure 510 form an in-cell structure or an on-cell structure.

For example, the touch controller 540 and the display controller 530 may be implemented as any suitable circuit or chip, or may be implemented as a combination of software, hardware, and firmware, which is not limited in the embodiments of the present disclosure.

For example, in the touch display device 50 illustrated in FIG. 5, the touch display device 50 further includes a controller 550, and the controller 550 can be used to coordinate the operations of the display controller 530 and the touch controller 540, so as to enable the touch display device 50 to provide both the display function and the touch function. For example, the controller 550 may be implemented as any suitable circuit or chip, or may be implemented as a combination of software, hardware, and firmware, which is not limited in the embodiments of the present disclosure.

For example, the functions or technical effects of the touch display device provided by the embodiments of the present disclosure may be with reference to the corresponding description of the touch display device including the pixel array 100 and the touch display device including the pixel array 200 in the above-mentioned embodiments.

Figure 6:
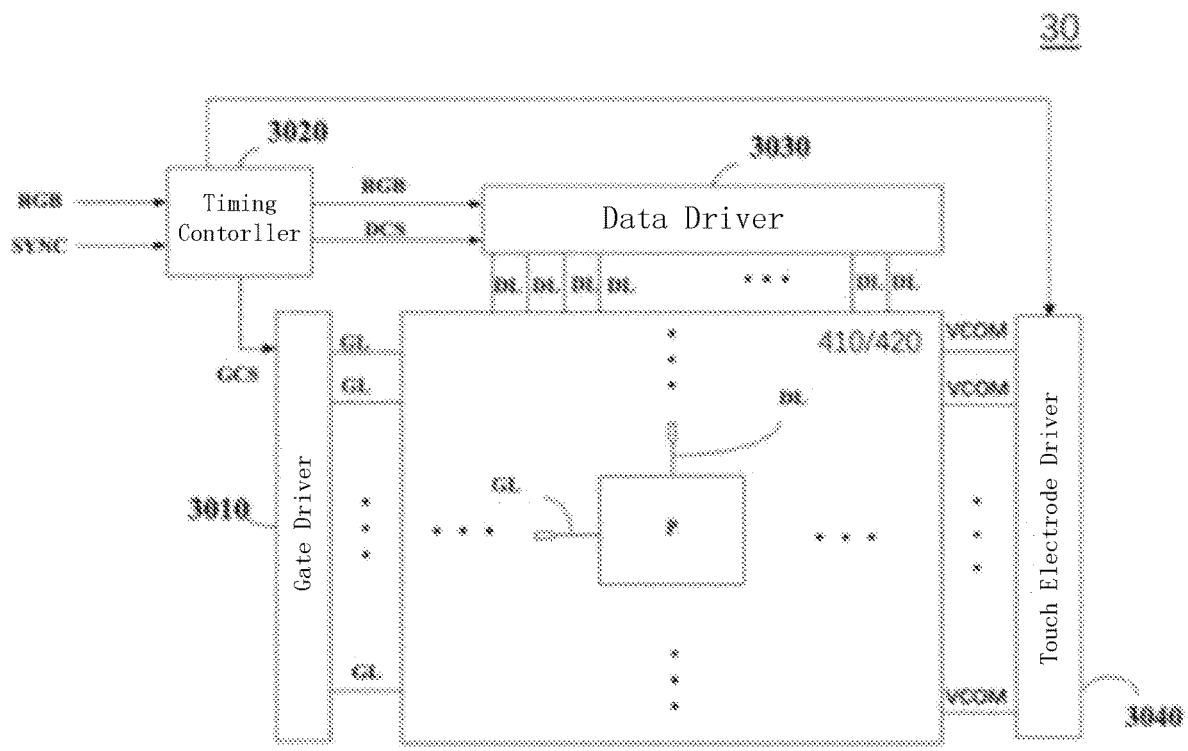
FIG. 6 is a schematic block diagram of another touch display device provided by some embodiments of the present disclosure.

FIG. 6 is a schematic block diagram of another touch display device provided by some embodiments of the present disclosure. For example, as illustrated in FIG. 6, a touch display device 30 includes a display structure 410 and a touch structure 420, and the display structure 410 includes display sub-pixels P. For example, the display sub-pixels P may be arranged in the pixel array 100 illustrated in FIG. 1 or the pixel array 200 illustrated in FIG. 4.

It should be noted that, in the touch display device 30, the display structure 410 and the touch structure 420 are stacked with each other. In order to facilitate illustrating the signal connection relationship in FIG. 6, the display structure 410 and the touch structure 420 are represented by the same block.

For example, the touch display device 30 may be any product or component with a display function and a touch function, such as a liquid crystal panel, a liquid crystal television, a display, an OLED panel, an OLED television, an electronic paper display device, a mobile phone, a tablet computer, a notebook computer, a digital photo frame, a navigator, or the like, and the embodiments of the present disclosure are not limited in this aspect. The technical effects of the touch display device 30 may be with reference to the corresponding descriptions of the touch display device including the pixel array 100 and the touch display device including the pixel array 200 in the above-mentioned embodiments, and details are not described herein.

For example, the touch display device 30 further includes a gate driver 3010, a timing controller 3020, and a data driver 3030. The gate driver 3010 is used to drive a plurality of scanning lines GL to provide gate scanning signals. The data driver 3030 is used to drive a plurality of data lines DL to provide display data (data signals). For example, the data driver 3030 includes a display controller, and the data signals are provided to the plurality of data lines DL under control of the display scanning signal provided by the display controller. The timing controller 3020 is used to process the image data RGB input from the external of the touch display device 30, provide the processed image data RGB to the data driver 3030, and respectively output the scanning control signal GCS and the data control signal DCS to the gate driver 3010 and the data driver 3030 so as to control the gate driver 3010 and the data driver 3030.

For example, the gate driver 3010 is connected to the plurality of scanning lines GL in correspondence. The plurality of scanning lines GL are correspondingly connected to the display sub-pixels P arranged in the plurality of rows. The gate driver 3010 sequentially outputs gate scanning signals to the plurality of scanning lines GL, so that the display sub-pixels P of the plurality of rows in the display structure 410 can be progressively scanned. For example, the gate driver 3010 may be implemented as a semiconductor chip, or may be integrated on, for example, the base substrate of the touch display device 30 to form a GOA circuit.

For example, the data driver 3030 uses the reference gamma voltage to convert digital image data RGB input from the timing controller 3020 into data signals according to a plurality of data control signals DCS from the timing controller 3020. For example, the converted data signals are provided to the plurality of data lines DL under control of the display scanning signal provided by the display controller. For example, the data driver 3030 may be implemented as a semiconductor chip.

For example, the timing controller 3020 processes externally input image data RGB to match the size and resolution of the display structure 410, and then provides the processed image data to the data driver 3030. The timing controller 3020 uses synchronization signals (such as a dot clock DCLK, a data enable signal DE, a horizontal synchronization signal Hsync, and a vertical synchronization signal Vsync) input from the external of the touch display device 30 to generate a plurality of scanning control signals GCS and a plurality of data control signals DCS. The timing controller 3020 provides the generated scanning control signals GCS and data control signals DCS to the gate driver 3010 and the data driver 3030, respectively, for controlling the gate driver 3010 and the data driver 3030.

For example, the touch display device 30 further includes a touch electrode driver 3040. The touch electrode driver 3040 is used to drive a plurality of touch scanning lines VCOM so as to provide touch scanning signals to the touch structure 420, thereby enabling the touch structure 420 to perform corresponding touch operations. For example, the touch electrode driver 3040 includes a touch controller, and the touch electrode driver 340 enables the touch controller to apply the touch scanning signal to the touch structure 420 under control of such as a control signal provided by the timing controller 3020. For example, the touch electrode driver 3040 may be implemented as a semiconductor chip.

It should be noted that the touch display device 30 may further include other components, such as a signal decoding circuit, a voltage conversion circuit, etc. These components may be, for example, existing conventional components, and details are not described herein.

At least one embodiment of the present disclosure further provides an electronic device, and the electronic device includes the touch display device provided by any one of the embodiments of the present disclosure, for example, includes the touch display device 30 or the touch display device 50 in the foregoing embodiments.

FIG. 7 is a schematic block diagram of an electronic device provided by some embodiments of the present disclosure. For example, as illustrated in FIG. 7, an electronic device 60 includes a touch display device 610. For example, the touch display device 610 may be the touch display device 50 illustrated in FIG. 5 or the touch display device 30 illustrated in FIG. 6.

The structure, function, technical effect and the like of the electronic device provided by the embodiments of the present disclosure may be with reference to the corresponding descriptions of the touch display device and touch driving method provided by the above embodiments of the present disclosure, and details are not described herein.

For example, the electronic device provided by the embodiments of the present disclosure may be any product or component with a display function and a touch function, such as a display substrate, a display panel, an electronic paper, a mobile phone, a tablet computer, a television, a display, a notebook computer, a digital photo frame, a navigator, etc., which is not limited in the embodiments of the present disclosure.

The following statements need to be noted.

(1) The drawings of the embodiments of the present disclosure involve only the structures related to the embodiments of the present disclosure, and other structures may be referred to general design.

(2) In case of no conflict, the embodiments of the present disclosure and the features in the embodiments can be combined with each other to obtain new embodiments.

What have been described above merely are specific implementations of the present disclosure, but the protection scope of the present disclosure is not limited to this. The protection scope of the present disclosure is determined by the appended claims.

What is claimed is:

1. A touch driving method for a touch display device, wherein the touch display device comprises a display structure and a touch structure stacked with the display structure, and the touch driving method comprises:
    applying a touch scanning signal, which is periodic, to the touch structure while applying display data to the display structure in a progressively scanning manner,
    wherein each period of the touch scanning signal comprises a signal rising edge and a signal falling edge, and the signal rising edge and the signal falling edge of at least one period of the touch scanning signal are in display scanning periods for scanning display sub-pixels of an identical color in different rows of the display structure.

2. The touch driving method according to claim 1, wherein the display sub-pixels are arranged in a pixel array, and the display sub-pixels of the identical color in different rows are adjacent to each other in a column direction.

3. The touch driving method according to claim 2, wherein the display sub-pixels comprise a plurality of first color sub-pixels, a plurality of second color sub-pixels, and a plurality of third color sub-pixels,
    in two adjacent rows, display sub-pixels in a first row are arranged in a cyclic sequence of one first color sub-pixel, one second color sub-pixel, one third color sub-pixel, and another second color sub-pixel in a row direction, and
    in the two adjacent rows, display sub-pixels in a second row are arranged in a cyclic sequence of one third color sub-pixel, one second color sub-pixel, one first color sub-pixel, and another second color sub-pixel in the row direction.

4. The touch driving method according to claim 3, wherein first color sub-pixels and third color sub-pixels in an identical row are scanned in an identical display scanning period, and display scanning periods of the plurality of second color sub-pixels alternate with display scanning periods of the plurality of first color sub-pixels and the plurality of third color sub-pixels.

5. The touch driving method according to claim 3, wherein the first color sub-pixels are red sub-pixels, the second color sub-pixels are green sub-pixels, and the third color sub-pixels are blue sub-pixels, or the first color sub-pixels are blue sub-pixels, the second color sub-pixels are green sub-pixels, and the third color sub-pixels are red sub-pixels.

6. The touch driving method according to claim 1, wherein the display sub-pixels are arranged in a pixel array, and the display sub-pixels of the identical color in different rows are adjacent to each other in a row direction and not adjacent to each other in a column direction.

7. The touch driving method according to claim 6, wherein the display sub-pixels comprise a plurality of first color sub-pixels, a plurality of second color sub-pixels, and a plurality of third color sub-pixels, and display sub-pixels in each column are arranged in a cyclic sequence of one first color sub-pixel, one second color sub-pixel, and one third color sub-pixel in the column direction.

8. The touch driving method according to claim 1, wherein, in each period of the touch scanning signal, the signal rising edge is prior to the signal falling edge, or in each period of the touch scanning signal, the signal falling edge is prior to the signal rising edge.

9. The touch driving method according to claim 1, wherein a frequency of the touch scanning signal is half of a frequency corresponding to a display scanning period of one display sub-pixel.

10. The touch driving method according to claim 1, wherein, during a display scanning period of each of the display sub-pixels, display data is applied to the each of the display sub-pixels under control of a display scanning signal.

11. The touch driving method according to claim 1, wherein the touch structure is configured to switch working states in response to the signal rising edge and the signal falling edge.

12. The touch driving method according to claim 1, wherein the signal rising edge is a phase of the touch scanning signal changing from a first level to a second level, the signal falling edge is a phase of the touch scanning signal changing from the second level to the first level, and the second level is higher than the first level.

13. A touch display device, comprising a display structure, a touch structure, and a touch controller, wherein the display structure is stacked with the touch structure, the touch controller is configured to apply a touch scanning signal, which is periodic, to the touch structure while applying display data to the display structure in a progressively scanning manner, each period of the touch scanning signal comprises a signal rising edge and a signal falling edge, and the signal rising edge and the signal falling edge of at least one period of the touch scanning signal are in display scanning periods for scanning display sub-pixels of an identical color in different rows of the display structure.

14. The touch display device according to claim 13, wherein the display sub-pixels are arranged in a pixel array, and the display sub-pixels of the identical color in different rows are adjacent to each other in a column direction.

15. The touch display device according to claim 14, wherein the display sub-pixels comprise a plurality of first color sub-pixels, a plurality of second color sub-pixels, and a plurality of third color sub-pixels, in two adjacent rows, display sub-pixels in a first row are arranged in a cyclic sequence of one first color sub-pixel, one second color sub-pixel, one third color sub-pixel, and another second color sub-pixel in a row direction, and in the two adjacent rows, display sub-pixels in a second row are arranged in a cyclic sequence of one third color sub-pixel, one second color sub-pixel, one first color sub-pixel, and another second color sub-pixel in the row direction.

16. The touch display device according to claim 15, wherein the first color sub-pixels are red sub-pixels, the second color sub-pixels are green sub-pixels, and the third color sub-pixels are blue sub-pixels, or the first color sub-pixels are blue sub-pixels, the second color sub-pixels are green sub-pixels, and the third color sub-pixels are red sub-pixels.

17. The touch display device according to claim 13, further comprising a display controller, wherein the display controller is configured to provide a display scanning signal so as to allow the display data to be applied to the display sub-pixels.

18. The touch display device according to claim 13, wherein the touch structure comprises a self-capacitive touch structure or a mutual-capacitive touch structure.

19. The touch display device according to claim 13, wherein the touch structure and the display structure form an in-cell structure or an on-cell structure.

20. An electronic device, comprising the touch display device according to claim 13.

* * * * *